United States Patent [19]

Hata et al.

[11] Patent Number: 4,811,651
[45] Date of Patent: Mar. 14, 1989

[54] SPRING BRAKE CYLINDER

[75] Inventors: Yasuhisa Hata, Akashi; Osamu Akamatsu, Kobe, both of Japan

[73] Assignee: Nippon Air Brake Co., Ltd., Kobe, Japan

[21] Appl. No.: 32,146

[22] Filed: Mar. 27, 1987

[30] Foreign Application Priority Data

Mar. 28, 1986 [JP] Japan .................. 61-71600

[51] Int. Cl.$^4$ ............................... F01B 9/00
[52] U.S. Cl. .................. 92/29; 92/130 A; 74/128
[58] Field of Search ............ 92/5 R, 5 L, 29, 21 MR, 92/129, 130 A, 23; 74/128; 403/324, 322, 325

[56] References Cited

U.S. PATENT DOCUMENTS

| | | | |
|---|---|---|---|
| 2,741,239 | 4/1956 | Nagode | 74/128 |
| 3,498,188 | 3/1970 | Rodriguez | 92/29 |
| 3,994,206 | 11/1976 | Dahlkvist | 92/29 |
| 4,671,167 | 6/1987 | Endo | 91/369 A |

Primary Examiner—Robert E. Garrett
Assistant Examiner—Thomas Denion
Attorney, Agent, or Firm—Jr. Ray

[57] ABSTRACT

A spring brake assembly having a body portion in which a piston is mounted for reciprocal movement. A piston guide means engages a stem portion of the piston and an end of the body portion. A brake spring is caged between an inner surface of a face portion of the piston and an end of the body portion. Engageable at one end thereof with the stem portion of the piston is a pushrod which also extends coaxially out of the end of the body portion. A clutch including control and operating devices is provided.

7 Claims, 4 Drawing Sheets

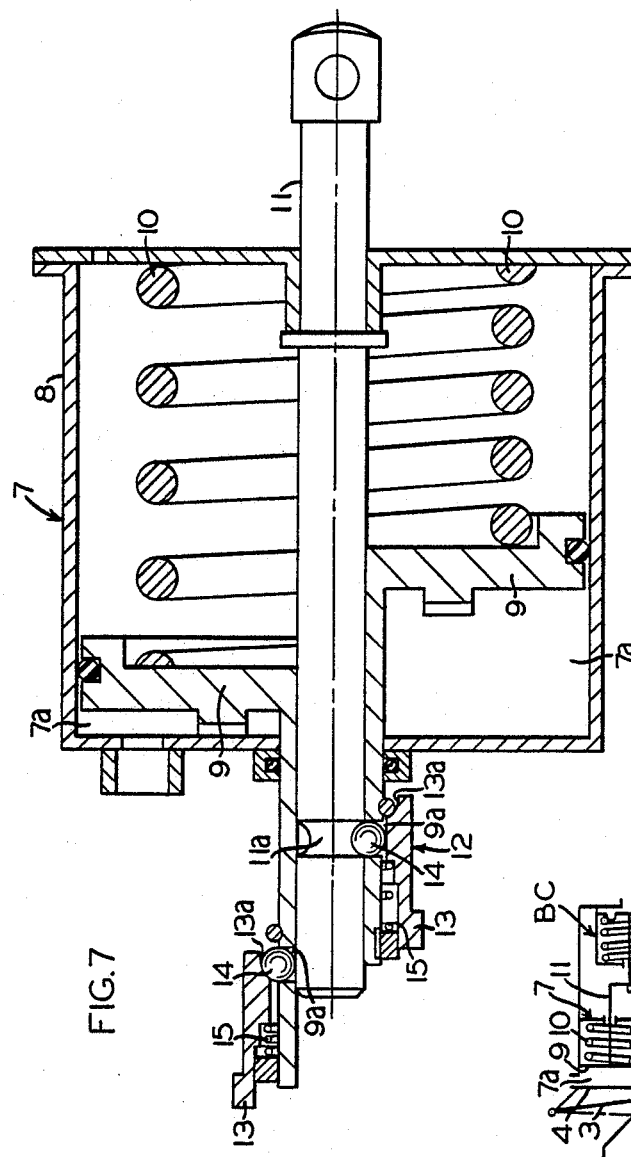
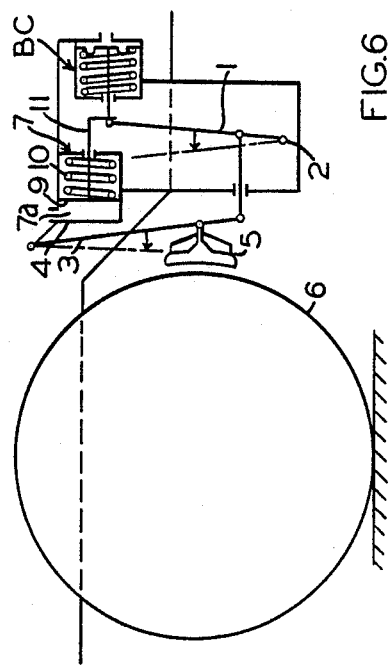
FIG.7
FIG.6

SPRING BRAKE CYLINDER

This invention relates to the spring brake cylinder, as disclosed in our Japanese Patent Application No. P61-71600, which is incorporated herein by reference thereto, which consists of the following parts: A cylinder body, a piston housed in the cylinder body, a brake spring which works to push back the iston to its normal position, a pushrod for braking which extends from the piston coaxially to come out of one of the ends of the cylinder body, a clutch which is located between the piston and the pushrod and makes connection and disconnection of their relative displacements in the axial direction, and an operation part which engages or disengages the clutch.

The invented spring brake cylinder has the following features: The clutch is altered to be equipped with a control part which makes a connection or disconnection by normal or reverse rotation. The operation part is built to connect the exterior of the cylinder body side and the control part which can be rotated in the normal or reverse direction by translational motions of the operation part.

DETAILED DESCRIPTION OF THE INVENTION

Industrial Application

Figure 1:
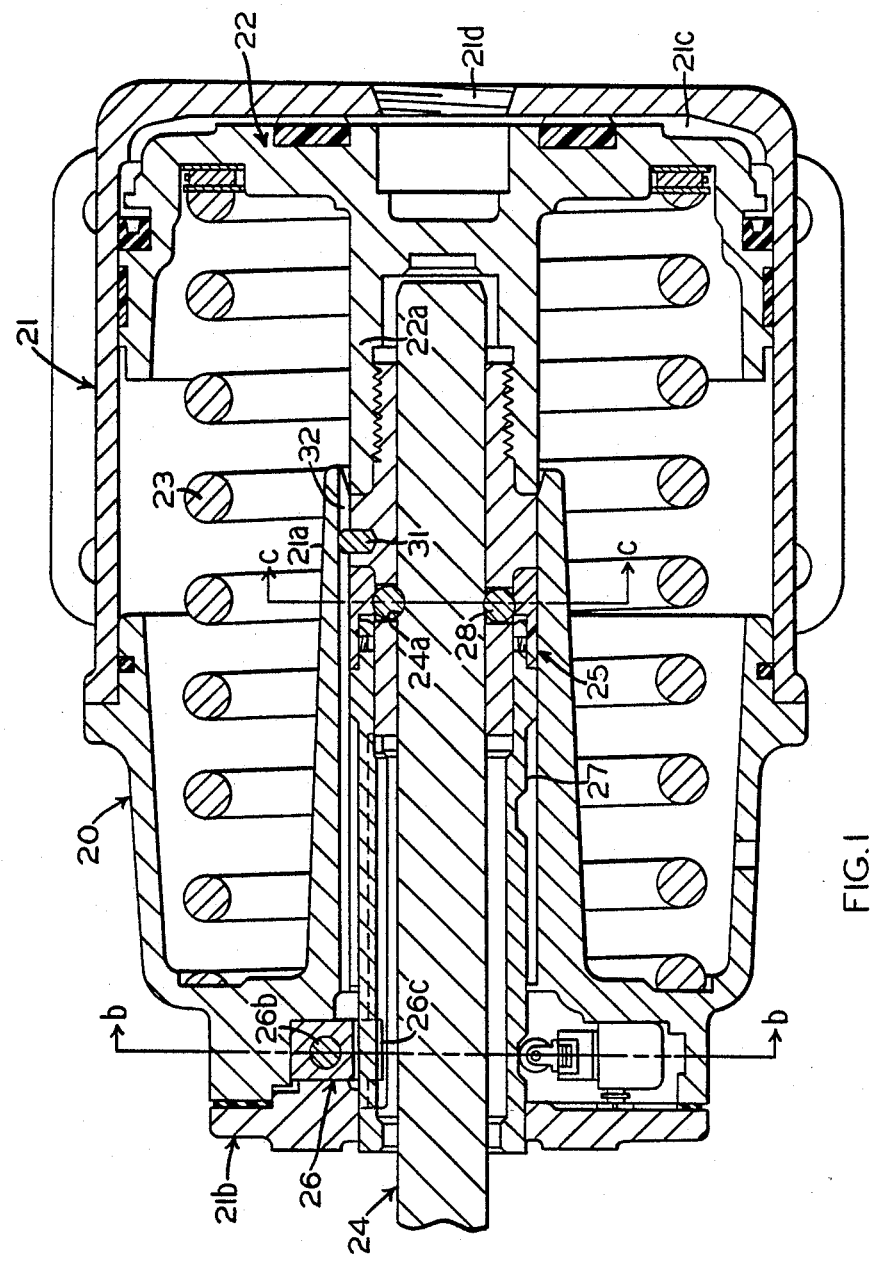

This invention relates to a spring brake cylinder used for railroad cars as a parking brake, for example, especially the spring brake cylinder with a manual release mechanism.

Conventional Technology

An example of conventional spring brake cylinders is shown in FIG. 7. As shown in FIG. 6, they are employed as part of a brake unit or connected to a basic brake device through a brake lever. Normal brake operation is activated as follows: Compressed air is supplied to the brake cylinder BC in FIG. 6 from an air brake control device which is not shown. As a result, the piston rod is pushed out to let the lever 2 swing to the position indicated by a single dotted broken line with its bottom end as a pivot. The suspending rod 3, being connected to the lever, swings as shown by a single dotted broken line with its top end as a pivot 4. The brake shoe 5 held by the suspending rod 3 will be pressed against the rim of the wheel 6 causing braking. When the compressed air is evacuated from the brake cylinder BC, the lever 1 and the suspending rod 3 are in the positions shown by solid lines in the figure and the brake is released.

The spring brake cylinder 7 is a separate unit from the brake cylinder for normal brake operation just described. In FIG. 7, 8 shows the cylinder body, 9 the piston, 10 the spring for spring braking, 11 the pushrod, 12 the clutch and 13 the clutch control part. As shown in FIG. 6, this brake cylinder 7 has its pushrod 11 connected to the lever 1. When the pushrod 11 moves to the left from the position shown in the figure, the condition of being connected to lever 1 causes the lever 1 to swing. The lever 1 alone can swing to the left freely, however. Normal braking operation with the brake cylinder BC is made with the pushrod 11 moved to the rightmost position as shown in the figure. The spring brake cylinder 7 is therefore not involved in the operation. As depicted in FIG. 6, the state where the pushrod 11 is in the rightmost position is realized by compressed air in the cylinder room 7a of the spring brake cylinder 7. The piston 9 is pushed to the right against the spring 10 and the clutch 12 is connecting the piston 9 and the pushrod 11. This corresponds to the state shown as a bottom half section of FIG. 7.

As mentioned above, the spring brake cylinder 7 is used, for example, to keep the brake set in parking. Its normal position is shown as a bottom half section of FIG. 7. When the compressed air in the cylinder room 7a is evacuated, the spring 10 will let the right end of the pushrod 11 pull the top of the lever 1 to the left. This causes the lever 1 to swing and the brake will be applied in just the same way as the brake cylinder BC is activated.

The clutch 12 serves to release the brake without using compressed air when the spring brake cylinder 7 is in the braking state. As shown in FIG. 7, it intermediates between the piston 9 and the pushrod 11 and consists of a channel 11a in the pushrod 11, several balls 14 which relate to the channel 11a, a control part 13, a spring 15 and others. The balls 14 are held in holes 9a which are drilled in the cylinder-shaped part of the piston 9. The clutch 12 is shown in its engaged state in the bottom half of FIG. 7 and in its disengaged state in the top half of the figure. The clutch 12 is disengaged from its engaged position by moving the control part 13 along the rod axis against the spring 15. Because the larger inner diameter part 13a comes to the position of the balls 14, the clutch 12 is disengaged. In this state, the pushrod 11 does not move to the left, even if the piston 9 is in its leftmost position after the air is exhausted from the cylinder room 7a. Therefore the spring brake cylinder 7 does not cause braking.

The spring brake cylinder 7 which is equipped with a clutch as shown in FIG. 7 is described in the detailed description of U.S. Pat. No. 3,498,188. Also improved versions of this exist as U.S. Pat. No. 4,080,875 and U.S. Pat. No. 4,480,531. All of these, in the manual release of the spring brake cylinder operation, or in disengaging the clutch, require an operation either pulling along the pushrod axis or rotation around this axis. As a result, the operation part is at the center of the end of the cylinder body.

Problems Intented to be Solved with the Present Invention

The spring brake cylinder used in railroad cars is attached to the wheeled base. There is very little space for the operation mechanism for the manual release operation. For this reason, it is desirable to be able to release the brake with small force and simple operations perferably from the side of the wheeled base. With the conventional spring brake cylinder described above, however, the operation part is installed at the center of the end of the cylinder body. This makes the operation more difficult. When a handle is attached at the end of the cylinder for translational operation along the axis, even if the necessary stroke may be obtained, its manual operation is extremely difficult because of limited free space. When the operation is a rotational one, it requires a special tool and this adds difficulties for the operation.

This invention makes it possible to build a spring brake cylinder which enables simple and speedy spring brake release from the side of the cylinder without tools.

Methods to Solve the Problems

The methods in this invention relate to the spring brake cylinder which consists of the following parts: A cylinder body, a piston inside the cylinder body, a brake spring which works to push back the piston to its normal position, a pushrod for braking which extends from the piston coaxially to come out of one of the ends of the cylinder body, a clutch which is located between the piston and the pushrod and makes connections and disconnections of their relative displacements in the axial direction, and an operation part which engages or disengages the clutch. The present methods have the following features: The clutch is altered to be equipped with a control part which makes a connection or disconnection by normal or reverse rotation. The operation part is built to cross from the exterior of the cylinder body side to the control part which can be rotated in normal or reverse direction by translational motion of the operation part.

Theory of Operation

With the aforementioned methods, engagements and disengagements of the clutch are made by translational motion of the operation part. Since one end of the operation part is located at the exterior of the cylinder body side, the following method, for example, is possible. One can build a mechanism which disengages the clutch by pulling an operation part. In this method, the brake can be easily released, simply by pulling the operation part because one can take advantage of the free space outside the cylinder side in the operation.

FIGURE CAPTIONS

FIG. 1: Cross sectional side view of the first installation example of the invention.

Figure 2:
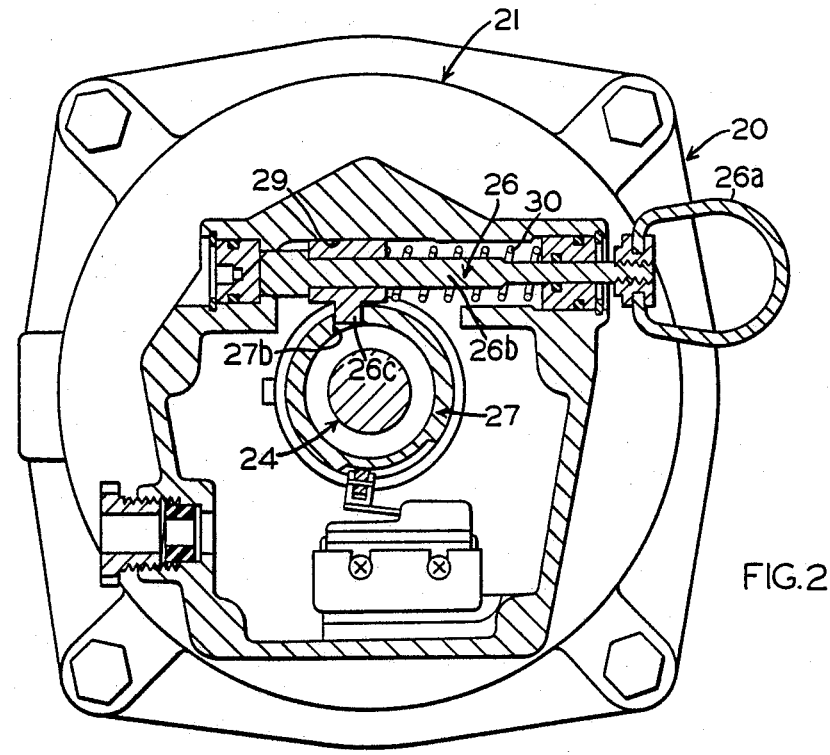

FIG. 2: b—b cross section in FIG. 1.

Figure 3:
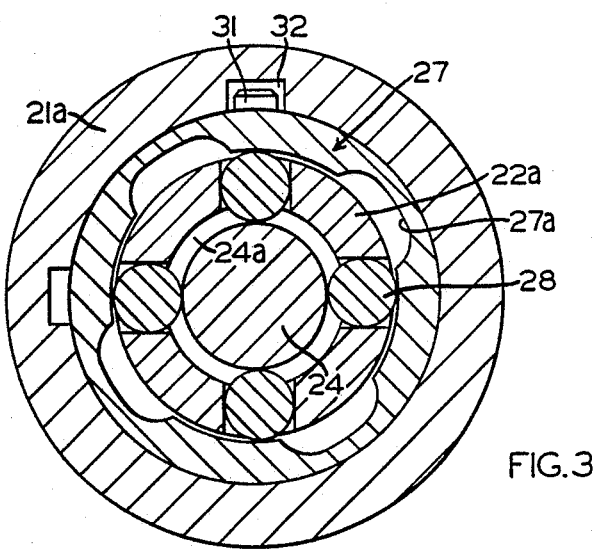

FIG. 3: Enlarged view of c—c cross section in FIG. 1.

Figure 4:
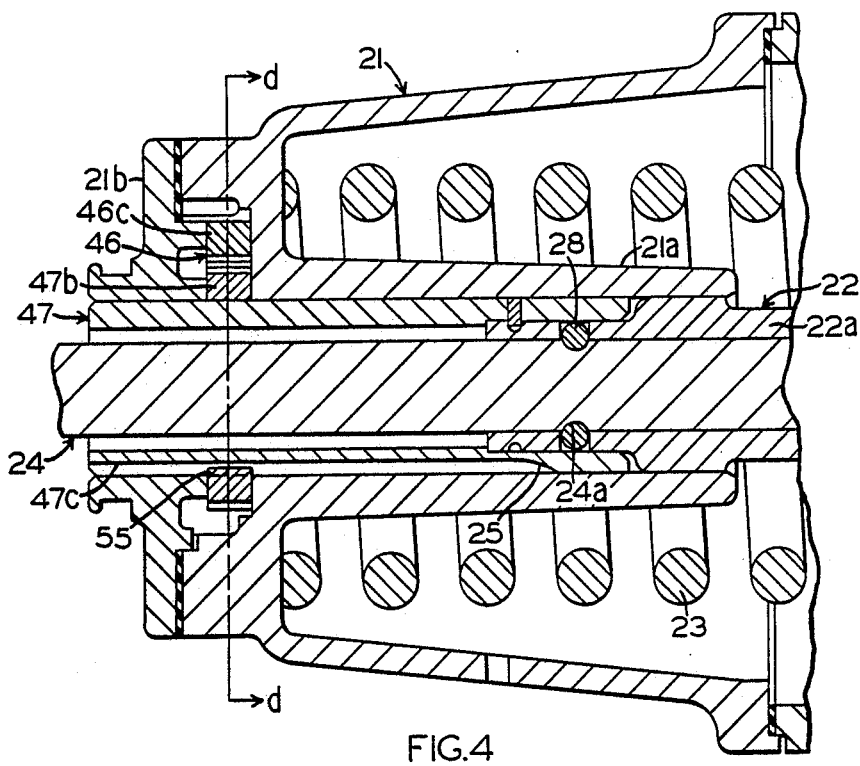

FIG. 4: Cross sectional side view of the main part of the second installation example.

Figure 5:
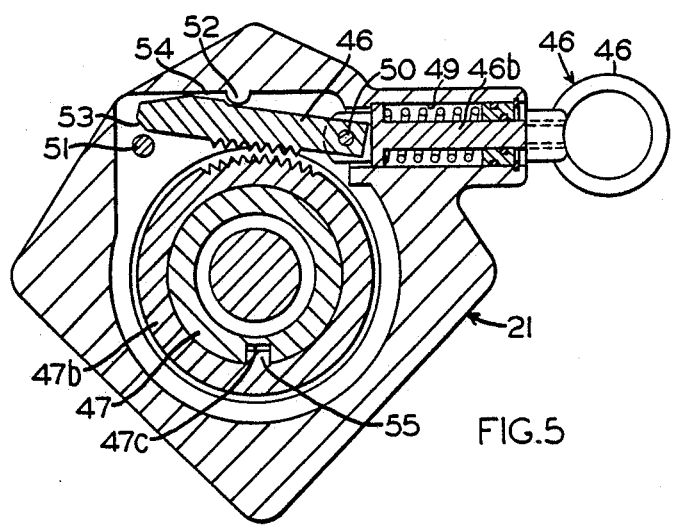

FIG. 5: d—d cross section in FIG. 4.

FIG. 6: Typical application of a spring brake cylinder.

FIG. 7: Cross sectional side view of a conventional spring brake cylinder design. Upper half and lower half each correspond to a different state.

21—cylinder body, 22—piston, 23—spring for spring braking, 24—pushrod, 25—clutch, 26, 46—operation part, 47—clutch control part.

EXAMPLES OF INSTALLATION

The first example of installation is illustrated in FIG. 1 and FIG. 3. In the figures, 20 indicates the whole brake cylinder assembly, 21 the cylinder body, 22 the piston, 23 the brake spring, 24 the pushrod, 25 the clutch, 26 the operation part, and 27 is the control part. This assembly differs from that shown in FIG. 7 in the following way. A cylindrical part 21a is built inside the cylinder body 21, forming an integral unit with the cylinder body 21. This part 21a fits the outside of the cylindrical portion 22a of the piston 22 and guides the motion of the piston. The clutch 25 is built between the cylindrical part 22a which is inside the cylindrical part 21a and the pushrod 24. The clutch 25 is a ball clutch with rotational control method. Also the operation part 26 is built at the end of the cylinder body 21 where the pushrod 24 comes out, connecting the control part 27 and the side exterior of the cylinder body 21. The control part 27 of the clutch 25 is built from separate parts and assembled with screws in this example. One may as well build it as a whole unit.

The clutch 25 is controlled between the engaged state and the disengaged state where free outward motion of the pushrod 24 is allowed. A channel 24a is cut in a ring shape on the pushrod. In the engaged state, the balls 28 which are held in four holes drilled into the cylindrical part 22a of the piston 22 are pushed into the channel and contained there by rotational motion of the control unit 27. The control unit 27 is a cylindrical body which extends from the portion of the cylindrical part 22a where the balls 28 are held to the end of the cylinder body 21. As shown in FIG. 3, at the position of the balls 28 four concaves 27a are cut in the internal wall corresponding to each of the balls 28. At the position where the control unit meets the operation unit 26, a channel 27b is cut at its exterior as shown in FIG. 2. The channel 27b is cut along the axis of the control unit 27 with a certain width and with the length which corresponds to the stroke of the piston 22.

As shown in FIG. 2, the operation part 26 consists of a handle 26a, a handle axis 26b and a hook 26c. It is housed inside the guide 29. The guide 29 is built between the cylinder body 21 and its lid 21b to allow translational motions of the operation part 26 along the cross section perpendicular to the axis of the cylinder body 21. The handle 26a is located at the external side of the cylinder 21. The hook 26c is locked in the channel 27b of the above mentioned control unit 27 and the whole unit is held at the leftmost position uner the pressure from the pushback spring 30. In this state, the control unit 27 holds the balls 28 in the channel 24a in the pushrod 24 as illustrated in FIG. 3. By pulling out the handle 26a from the cylinder body 21, the hook 26c rotates the control part 27 around its axis by a certain angle to bring the concave parts 27a to the outside of the balls 28. The clutch 25 engaged is thus disengaged.

This brake cylinder 20 can be used in the same way as explained using FIG. 6. Normally, compressed air is supplied to the cylinder room 21c of the cylinder body 21 through a compressed air in/outlet 21d. In this condition the piston 22 is moved from the position shown in FIG. 1 to the left, pushing against the spring 23. When the brake is applied by this brake cylinder 20, it corresponds to the condition shown in FIG. 1 where compressed air in the cylinder room 21c is evacuated. In this state, the clutch 25 is engaged and the pushrod 24 is pulled into the cylinder body 21. As shown in FIG. 6 by single dotted lines, the spring brake is activated by swinging the lever 1 and the suspending rod 3. This spring brake can be released manually by pulling out the handle 26a. The clutch 25 is now in the disengaged state and the pushrod 24 becomes free and does not transmit the force from the spring 23. The lever 1 returns to the released position by the action of the spring in the brake cylinder BC. The pushrod 24 follows this movement and the channel 24a in the pushrod 24 moves away from the balls 28. As a result, the operation part 26 remains at the same position even after the handle 26a is released. This is the state when the brake is released by manual operation.

When compressed air is supplied to the cylinder room 21c under this released condition, the piston 22 in FIG. 1 moves to the left. When the channel 24a moves to the position of the balls 28, the operation part 26 moves by the action of the spring 30, rotating the control part 27.

The balls 28 are thus locked in the channel 24a and the clutch 25 is engaged.

In FIG. 1 and FIG. 3, 31 is a pin and 32 is a channel. These will prevent rotations of the piston 22 and may be built as necessary.

The second example of the insallation is shown in FIGS. 4 and 5. This example differs from the first example in the connection parts between the operation part 46 and the control unit 47 of the clutch. Other parts are generally the same. The same numbers are given to the equivalent parts in the figures and the explanations will not be repeated.

As shown in FIG. 5, the operation part 46 consists of a handle 46a, handle axis 46b and a rack 46c which is joined to the handle axis 46b by a pivot 50. The handle axis 46b makes straight translational motions guided by a guide 49. The rack 46c which has teeth on its bottom side is guided by protrusions 51 and 52 inside the cylinder body 21. When it is pulled to the right from the position shown in FIG. 5, its left end moves downward with the pivot 50 at its axis of rotation before it moves horizontally. It follows the same path in the reversed motion. 53 and 54 in the figure indicate the plane to be guided.

Against the rack 46c of the operation part 46, the control part 47 has the pinion 47b. The pinion 47b on the outer surface of the control unit is made in such a way to allow relative displacements in the direction of the axis. The pinion 47b is constrained between the cylinder body 21 and the lid 21b to allow rotations only at this fixed position. It is joined to the control part 47 with its key 55 and the key channel 47c in the control part 47.

In this assembly, the rack 46c of the operation part 46 does not mesh with the pinion 47b at the beginning of the total stroke as it is pulled out. It will be engaged after some translational motion and is disengaged from the control part 47 when the operation part 46 is pushed in.

The assembly of the clutch 25 is the same as shown in FIG. 3.

This example of the spring brake cylinder is to be used in the same way as the first example of installation.

THE EFFECT OF THE INVENTION

With this invention, the braking by the spring brake cylinder can be released simply by pulling out the operation part from the side of the cylinder. Compared with the conventional designs, this is superior in ease of operation because one can take advantage of the free space at the side of the cylinder. Extra space at the end of the cylinder for ease of manual operations or special tools are not necessary. This easy operation is very effective in achieving the operation quickly.

We claim:

1. A spring brake cylinder assembly, said assembly comprising:
    (a) a body portion having a pair of axially opposed end walls;
    (b) a piston positioned for reciprocal axial movement within said body portion, said piston having a face portion adjacent a first end wall of said body portion and a stem portion extending in an axial direction from an inner surface of said face portion of said piston;
    (c) a piston guide means formed integrally with a second end wall of said body portion and engageable with said stem portion of said piston for guiding said piston in an axial direction during reciprocal axial movement of said piston;
    (d) a brake spring caged between said inner surface of said face portion of said piston and said second end wall of said body portion to supply a predetermined braking force to said assembly;
    (e) a pushrod engageable at one end thereof with said stem portion of said piston and extending coaxially out of said second end wall of said body portion;
    (f) a clutch means positioned for engagement with each of said stem portion of said piston and said pushrod and said piston guide means for making a connection and disconnection of said pushrod with said piston thereby controlling their relative displacement in an axial direction;
    (g) a clutch control means engageable with said clutch means and said piston guide means for controlling said clutch means between an engaged and disengaged state, said clutch control means including an elongated hollow portion surrounding said pushrod and extending out of said second end of said body portion; and
    (h) a clutch operation means positioned adjacent said second end of said body portion and engageable with said clutch control means for manually releasing said assembly from a brake application.

2. A spring brake assembly, according to claim 1, wherein each of said body portion and said face portion and said stem portion of said piston and said piston guide means and said pushrod is generally cylindrical in cross section.

3. A spring brake assembly, according to claim 2, wherein said stem portion of said piston is generally hollow and cylindrical in cross section.

4. A spring brake assembly, according to claim 3, wherein said piston includes a skirt portion adjacent said inner surface of said face portion.

5. A spring brake assembly, according to claim 1, wherein said clutch operating means includes:
    (a) a handle positioned to make substantially straight translational movement;
    (b) a guide engageable with said handle to maintain said handle in a substantially straight plane;
    (c) a rack pivotally connected to said handle, said rack having a plurality of teeth on at least one surface thereof for mating engagement with a plurality of teeth formed on said hollow portion of said clutch control means; and
    (d) a means for guiding said teeth on said rack into said mating engagement with said teeth on said hollow portion.

6. A spring brake assembly, according to claim 5, wherein said means for guiding said teeth on said rack is at least one protrusion positioned on one of said rack and said body portion.

7. A spring brake assembly, according to claim 1, wherein said clutch operating means includes:
    (a) a handle positioned to make substantially straight translational movement;
    (b) a guide engageable with said handle to enable translational movement of said handle in a plane perpendicular to an axis of said body portion; and
    (c) a hook means formed on said handle for engaging said hollow portion of said clutch control means.

* * * * *

UNITED STATES PATENT AND TRADEMARK OFFICE
CERTIFICATE OF CORRECTION

PATENT NO. : 4,811,651

DATED : March 14, 1989

INVENTOR(S) : Yasuhisa Hata and Osamu Akamatsu

It is certified that error appears in the above-identified patent and that said Letters Patent are hereby corrected as shown below:

Column 6, line 24, delete "operation" and insert --operating--

Signed and Sealed this

Fourteenth Day of November, 1989

Attest:

JEFFREY M. SAMUELS

Attesting Officer    Acting Commissioner of Patents and Trademarks